(12) United States Patent
Finn et al.

(10) Patent No.: US 7,711,472 B2
(45) Date of Patent: May 4, 2010

(54) NAVIGATION SYSTEM FOR A VEHICLE

(75) Inventors: Brian Finn, East Palo Alto, CA (US);
Carly Williams, Mountain View, CA (US)

(73) Assignee: Volkswagen AG, Wolfsburg (DE)

( * ) Notice: Subject to any disclaimer, the term of this patent is extended or adjusted under 35 U.S.C. 154(b) by 1161 days.

(21) Appl. No.: 11/323,914

(22) Filed: Dec. 30, 2005

(65) Prior Publication Data
US 2006/0235606 A1 Oct. 19, 2006

Related U.S. Application Data

(60) Provisional application No. 60/640,363, filed on Dec. 30, 2004.

(51) Int. Cl.
*G01C 21/34* (2006.01)
*G01C 21/00* (2006.01)

(52) U.S. Cl. .................. 701/200; 701/211; 340/995.19; 707/3

(58) Field of Classification Search .................. 701/200, 701/209, 210, 211; 340/995.19; 707/3, 4; 705/37
See application file for complete search history.

(56) References Cited

U.S. PATENT DOCUMENTS

| | | | |
|---|---|---|---|
| 5,991,739 A | 11/1999 | Cupps et al. .................. 705/26 |
| 6,122,593 A | 9/2000 | Friedrich et al. ............. 701/202 |
| 6,247,019 B1 | 6/2001 | Davies ........................ 707/103 |
| 6,308,177 B1 | 10/2001 | Israni et al. .................. 707/100 |
| 6,401,034 B1 * | 6/2002 | Kaplan et al. ................ 701/209 |
| 6,542,814 B2 | 4/2003 | Polidi et al. .................. 701/208 |
| 6,687,613 B2 * | 2/2004 | Yokota ........................ 701/209 |
| 7,107,147 B2 * | 9/2006 | Pascual et al. ............... 701/200 |
| 2002/0052674 A1 | 5/2002 | Chang et al. ................. 700/300 |
| 2003/0036848 A1 | 2/2003 | Sheha et al. ................. 701/209 |
| 2004/0148277 A1 | 7/2004 | Gray ............................. 707/3 |
| 2004/0260464 A1 * | 12/2004 | Wong .......................... 701/209 |
| 2004/0260465 A1 * | 12/2004 | Tu ............................... 701/209 |

FOREIGN PATENT DOCUMENTS

| | | |
|---|---|---|
| DE | 10144781 | 3/2003 |
| EP | 1156464 | 11/2001 |
| EP | 1249263 | 6/2004 |

* cited by examiner

*Primary Examiner*—Tan Q. Nguyen
(74) *Attorney, Agent, or Firm*—King & Spalding L.L.P.

(57) ABSTRACT

A navigation system for a vehicle includes a man-machine interface to enter at least one key word for characterization of a point of interest and to enter a geometric figure and a search module to search for at least one of the points of interest assigned to the key word within a geographic area defined by the geometric figure.

5 Claims, 7 Drawing Sheets

FIG. 1

| FEAT_NAME | POI_NAME | LAN CODE | BUILTUP_NAME | POSTAL CODE | STREET NAME | BASE_NAME | STREET_TYPE | STREETNAME | HOUSENR | FOOD_TYPE | PHONE_NUMBER |
|---|---|---|---|---|---|---|---|---|---|---|---|
| RESTAURANT | HAZEL«S | ENG | SAN FRANCISCO | 94107 | 18TH ST | 18TH | ST | 18TH ST | 1331 | CONTINENTAL FOOD | +(1)-(415)-6477941 |
| RESTAURANT | SHALVA | ENG | SAN FRANCISCO | 94107 | 18TH ST | 18TH | ST | 18TH ST | 1401 | FRENCH FOOD | +(1)-(415)-8213708 |
| HOTEL OR MOTEL | GUS PRESENTS | ENG | SAN FRANCISCO | 94107 | 18TH ST | 18TH | ST | 18TH ST | 1459 | | +(1)-(415)-8243224 |
| RESTAURANT | ELIZA RESTAURANT THANYA & SALEE | ENG | SAN FRANCISCO | 94107 | 18TH ST | 18TH | ST | 18TH ST | 1457 | CHINESE FOOD | +(1)-(415)-6489999 |
| RESTAURANT | R LOUIS STYNSON BAR | ENG | SAN FRANCISCO | 94107 | 18TH ST 34TH | 18TH | ST | 18TH ST 34TH | 1469 | CHINESE FOOD | +(1)-(415)-6476469 |
| SCHOOL | ELEMENTARY SCHL | ENG | SAN FRANCISCO | 94116 | AVE | 34TH | AVE | AVE | 2051 | | +(1)-(415)-7592837 |
| RESTAURANT | YUM YUM CAFE | ENG | SAN FRANCISCO | 94116 | 35TH AVE | 35TH | AVE | 35TH AVE | 2546 | CHINESE FOOD | +(1)-(415)-9579707 |
| SCHOOL | LAUREL ELEMENTARY | ENG | SAN MATEO | 94403 | 36TH AVE | 36TH | AVE | 36TH AVE | 316 | HAWAIIAN FOOD | +(1)-(415)-3127555 |
| RESTAURANT | ROY«S | ENG | SAN FRANCISCO | 94105 | 2ND ST | 2ND | ST | 2ND ST | 101 | | +(1)-(415)-7770277 |
| BANK | HSBC WEALTH & TAX ADVISORY | ENG | SAN FRANCISCO | 94105 | 2ND ST | 2ND | ST | 2ND ST | 101 | | +(1)-(415)-8965832 |
| ATM | HSBC WEALTH & TAX ADVISORY | ENG | SAN FRANCISCO | 94105 | 2ND ST | 2ND | ST | 2ND ST | 101 | AMERICAN FOOD | |
| RESTAURANT | EDDIE«S RICKENBACKER | ENG | SAN FRANCISCO | 94105 | 2ND ST | 2ND | ST | 2ND ST | 133 | | +(1)-(415)-5433498 |
| ATM | PATELCO | ENG | SAN FRANCISCO | 94105 | 2ND ST | 2ND | ST | 2ND ST | 144 | | |
| ATM | PATELCO CREDIT UNION | ENG | SAN FRANCISCO | 94105 | 2ND ST | 2ND | ST | 2ND ST | 156 | | |
| RESTAURANT | TEMPURA HOUSE II RISTORANTE | ENG | SAN FRANCISCO | 94105 | 2ND ST | 2ND | ST | 2ND ST | 171 | JAPANESE FOOD | +(1)-(415)-2819000 |
| RESTAURANT | UMBRIA | ENG | SAN FRANCISCO | 94105 | 2ND ST | 2ND | ST | 2ND ST | 198 | MEXICA FOOD | +(1)-(415)-5466985 |
| RESTAURANT | JERICHO«S | ENG | SAN FRANCISCO | 94105 | 2ND ST | 2ND | ST | 2ND ST | 168 | SANDWICH | +(1)-(415)-9790599 |
| BUSINESS FACILITY | CNET NETWORKS | ENG | SAN FRANCISCO | 94105 | 2ND ST | 2ND | ST | 2ND ST | 235 | | +(1)-(415)-3442000 |
| RESTAURANT | MARRIOTT | ENG | SAN FRANCISCO | 94105 | 2ND ST | 2ND | ST | 2ND ST | 299 | OTHER | +(1)-(415)-9470700 |
| RESTAURANT | TULLYS 2ND ST | ENG | SAN FRANCISCO | 94107 | 2ND ST | 2ND | ST | 2ND ST | 303 | OTHER | +(1)-(415)-3699545 |
| LIBRARY | SUPREME COURT CA LAW LIBRARY | ENG | SAN FRANCISCO | 94107 | 2ND ST | 2ND | ST | 2ND ST | 303 | | +(1)-(415)-8829313 |
| RESTAURANT | INFUSION BAR & RESTAURANT | ENG | SAN FRANCISCO | 94107 | 2ND ST | 2ND | ST | 2ND ST | 555 | OTHER | +(1)-(415)-5432282 |
| RESTAURANT | 21ST AMENDMENT BREWRY CAFE LLC | ENG | SAN FRANCISCO | 94107 | 2ND ST | 2ND | ST | 2ND ST | 563 | AMERICAN FOOD | +(1)-(415)-3690900 |
| RESTAURANT | 2B RESTAURANT & BAR | ENG | SAN FRANCISCO | 94107 | 2ND ST | 2ND | ST | 2ND ST | 598 | OTHER | +(1)-(415)-9745569 |
| RESTAURANT | GIFTS A LACART-HOMEWARD BOUND | ENG | SAN FRANCISCO | 94107 | 2ND ST | 2ND | ST | 2ND ST | 625 | AMERICAN FOOD | +(1)-(415)-3628787 |
| BUSINESS FACILITY | LOOKSMARTCOM PARAGON | ENG | SAN FRANCISCO | 94107 | 2ND ST | 2ND | ST | 2ND ST | 625 | | +(1)-(415)-3487000 |
| RESTAURANT | RESTAURANT & BAR CLEMENT STREET | ENG | SAN FRANCISCO | 94107 | 2ND ST | 2ND | ST | 2ND ST | 701 | OTHER | +(1)-(415)-5379020 |
| UNIVERSITY OR COLLEGE | COUNSELING CENTER | ENG | SAN FRANCISCO | 94118 | 3RD AVE | 3RD | AVE | 3RD AVE | 301 | | +(1)-(415)-2219227 |

NAVIGATION SYSTEM FOR A VEHICLE

CROSS-REFERENCE TO RELATED APPLICATIONS

This application claims the benefit of U.S. Provisional Application No. 60/640,363 filed on Dec. 30, 2004, entitled "NAVIGATIONSSYSTEM FÜR EIN KRAFTFAHRZEUG", which is incorporated herein by reference in its entirety.

TECHNICAL FIELD

The invention concerns a navigation system for a vehicle.

BACKGROUND

A navigation system for a vehicle is known from U.S. Pat. No. 6,401,029 B1. In navigation systems for vehicles a search option according to the so-called points of interest (POIs) can be implemented. Details concerning points of interest or implementation of a search option according to so-called points of interest in a navigation system for a vehicle can be deduced for example, from U.S. Pat. No. 6,278,940 B1, U.S. Pat. No. 6,542,814 B1, EP 1 365 213 A1 or DE 101 32 887 A1.

Thus, DE 101 32 887 A1 discloses the system for navigation of a vehicle from a location to a destination, having an input device to enter a command and/or a location and/or a destination, in which the input device has a voice input module that recognizes a voice input and converts it to a corresponding input to the system, in which the voice input module has a memory unit for elements of a navigation database especially for command names and/or location names and/or street names and/or points of interest, in which an element of the navigation database, especially a command name or location name or a street name or point of interest is assigned to a voice input by comparison by means of a comparator device and this allocated element is sent as a system, location and/or destination to the system, in which the comparator device is laid out for comparison of the voice input with subsets, especially with sequential sections or with consecutive subsets of elements of the navigation database entered in the memory unit.

SUMMARY

The task of the invention is to improve and facilitate finding of points of interest (POIs).

The aforementioned task is solved by a navigation system for a vehicle in which the navigation system includes a man-machine interface to enter at least one keyword for characterization of points of interest (POIs) and to enter a geometric figure assigned especially to a geographic location and a search module to search for at least one of the points of interest (POIs) assigned to the key word within a geographic area defined by the geometric figure. It is then prescribed in particular that the search can be made according to two or more key words, especially a cut-set.

A point of interest (POI) according to the invention can be, for example, a hotel, an airport, a restaurant, a railroad station, a police station, an emergency call device, a theater, a cinema, etc. Details concerning points of interest (POIs) can be taken from U.S. Pat. No. 6,278,940 B1, U.S. Pat. No. 6,542,814 B1, EP 1 365 213 A1 or DE 101 32 8887 A1.

The key word according to the invention can be a name, a part of a name, a branch designation, a part of the branch designation, the designation of a product or service, an address, a part of an address and/or a term and/or information component otherwise assigned to the point of interest. In one embodiment of the invention, the geometric figure is essentially round, especially essentially a circle. In another embodiment of the invention this circle can be established by entering its radius. The position of the vehicle or a destination position is then the center of the circle in another embodiment of the invention.

In another embodiment of the invention the navigation system also includes a database of at least one point of interest and an allocation of at least one point of interest to a geographic partial area, as well as especially an allocation of the geographic partial area to the geographic area. A geographic partial area according to the invention can itself be a geographic area according to the invention and includes geographic partial areas.

The aforementioned task can also be solved by a database for a navigation system of the vehicle in which the database includes at least point of interest and one allocation of at least one point of interest to a geographic partial area, as well as especially an allocation of the geographic partial area to a geographic area.

The aforementioned task can also be solved by a method for production of a database for a navigation system of a vehicle in which a point is interest is selected, the point of interest being assigned to a geographic area and in which is it checked whether a maximum assignable number of points of interest to the geographic area is reached.

In one embodiment of the invention, the geographic area is divided into at least two geographic partial areas when the maximum number of points of interest assignable to the geographic area is reached.

In another embodiment of the invention the at least one geographic partial area is essentially rectangular or square or the geographic partial areas are essentially rectangular or square.

In another embodiment of the invention the points of interest assigned to the geographic area are each assigned to one of the at least two geographic partial areas.

In another embodiment of the invention, the assignment between the geographic area and the previously assigned points of interest is erased.

In another embodiment of the invention the points of interest and the assignment of points of interest to the geographic partial area as well as especially assignment of the geographic partial area to the geographic area is included in the database.

In another embodiment of the invention the method is repeated with an additional point of interest.

In another embodiment of the invention the geographic area is divided into four geographic partial areas when the maximum number of points of interest assignable to the geographic area is reached.

The geographic area or a geographic partial area according to the invention includes especially an area of no less than 1000 $m^2$, especially no less than 10,000 $m^2$.

Vehicle according to the invention is especially a land useable individually in street traffic. Vehicles according to the invention are not particularly restricted to land vehicle with an internal combustion engine.

Further advantages of details are apparent from the following description of practical examples.

BRIEF DESCRIPTION OF THE DRAWINGS

FIG. 2 shows a practical example of a format for storing of points of interest;

DETAILED DESCRIPTION

Figure 1:
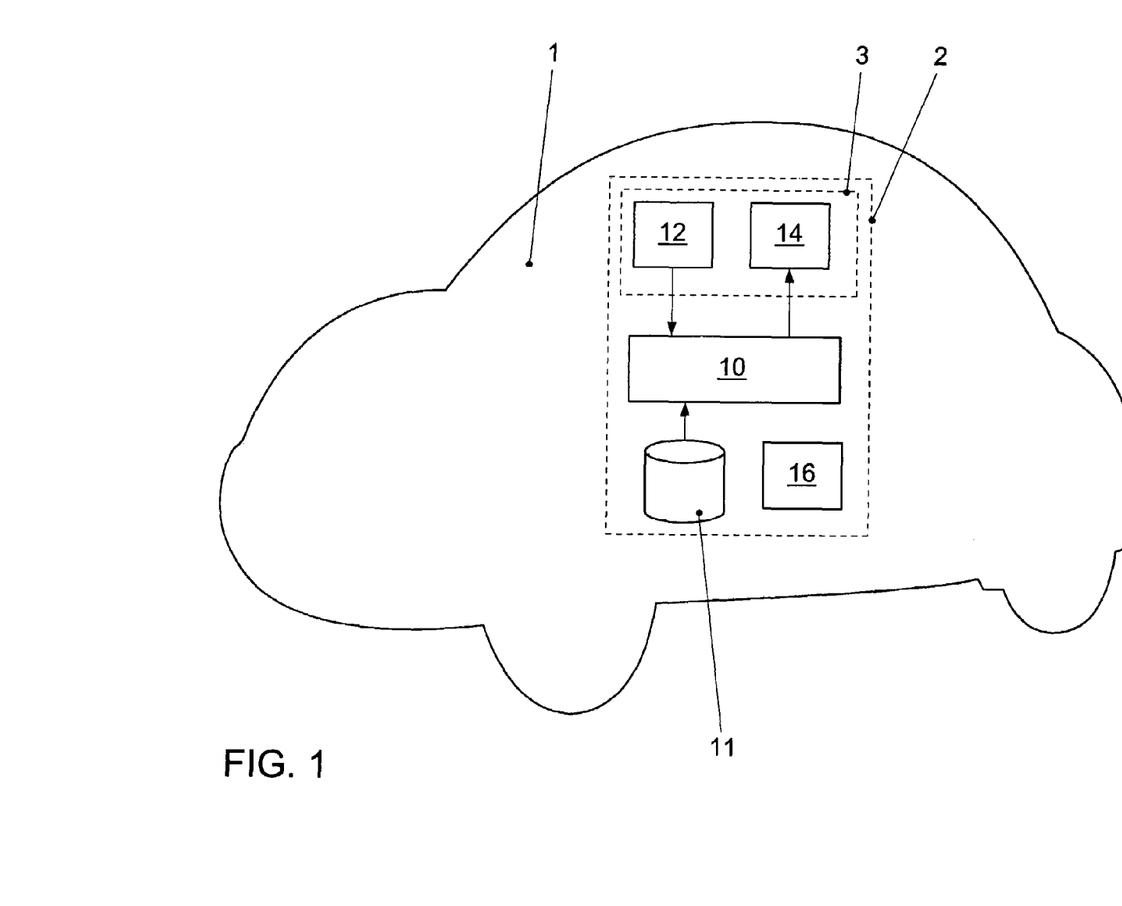
FIG. 1 shows a practical example of a vehicle with a navigation system.

FIG. 1 shows a practical example of vehicle 1 with a navigation system 2. The navigation system 2 includes a navigation module 16 in which functions, like location determination and route calculation are implemented. The navigation system 2 also includes a database 11 in which points of interest are stored. Points of interest can be stored, for example, in the form of a format disclosed in FIG. 3 in EP 1 365 213 A1. Points of interest, for example, can also be stored in the form of a format depicted in FIG. 2. FIG. 2 then shows a cutout from a NAVTEC database. In addition, the geographic partial area and/or a geographic area are assigned to the points of interest in the database 11.

Figure 3:
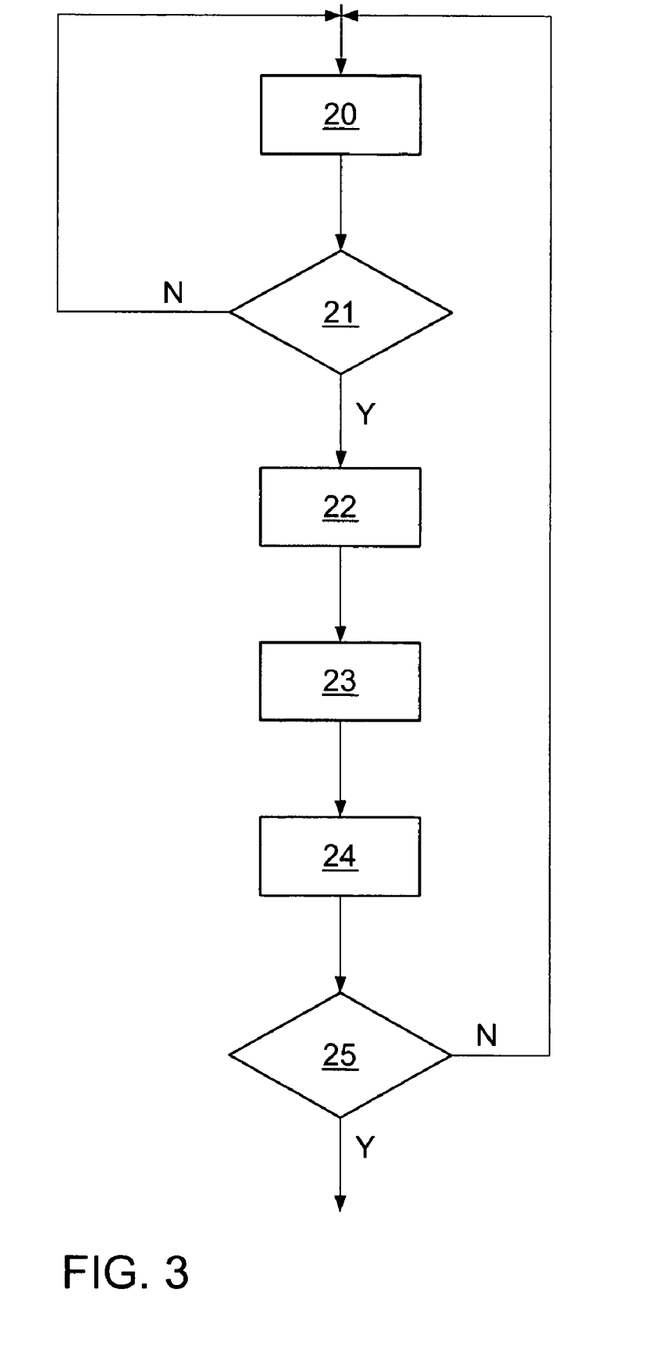
FIG. 3 shows a practical example of a method for production of a database for a navigation system of the vehicle.
Figure 4:
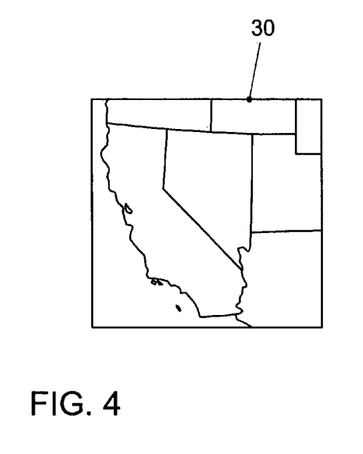
FIG. 4 shows a practical example of a geographic area.

FIG. 3 shows a practical example of a procedure of a method for production of a corresponding database 11 for navigation system 2 of vehicle 1. The method begins with a step 20, in which a point of interest is chosen, for example, from a list depicted in FIG. 2 and a point of interest is assigned to a geographic area 30, depicted in FIG. 4. Step 20 is followed by a query 21 whether a maximum number of points of interest assignable to the geographic area 30 is reached. If the maximum number of points of interest assignable to the geographic area 30 is not reached, query 21 follows step 20, in which another point of interest is chosen for example, from the list depicted in FIG. 2 and the point of interest is assigned to geographic area 30.

Figure 5:
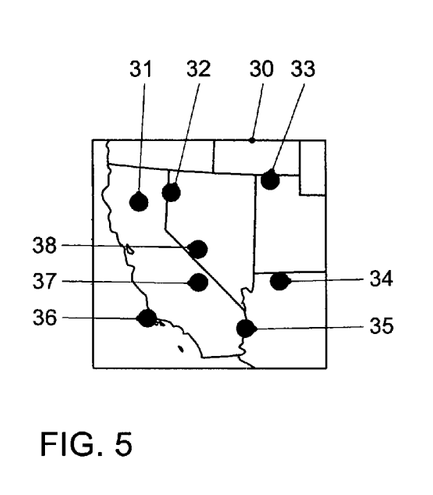
FIG. 5 shows a practical example of assignment of points of interest to the geographic area according to FIG. 4.
Figure 6:
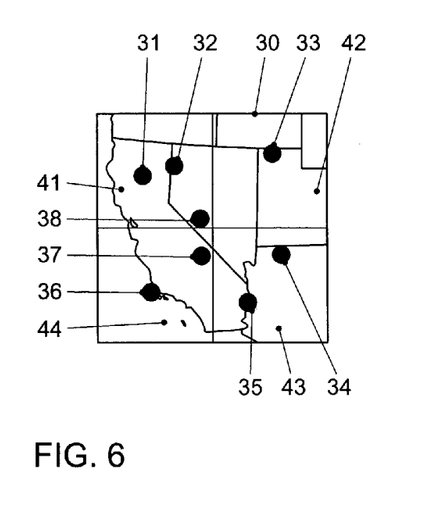
FIG. 6 shows a practical example for division of the geographic area according to FIG. 4 in the geographic partial areas.

If, as shown in FIG. 5, for example, the number of points of interest 31, 32, 33, 34, 35, 36, 37, 38 assigned to the geographic area 30 reaches the maximum number of points of interest assignable to geographic area 30, a step 22 follows query 21 in which the geographic area 30, as shown for the example in FIG. 6, is divided into four essentially square geographic partial areas 41, 42, 43, 44. A step 23 follows step 22, in which the points of interest 31, 32 and 38 assigned to geographic area 30 are assigned to one of the geographic partial areas 41, 42, 43, 44 as a function of their geographic location. Thus, with reference to the example according to FIG. 6 the points of interest 31, 32 and 38 are assigned to geographic partial area 41, point of interest 33 is assigned to geographic partial area 42, points of interest 34 and 35 are assigned to geographic partial area 43 and points of interest 36 and 37 are assigned to geographic partial area 44. Step 23 is follows by a step 24 in which the assignments of points of interest 31, 32, 33, 34, 35, 36, 37, 38 to geographic area 30 are erased.

Figure 7:
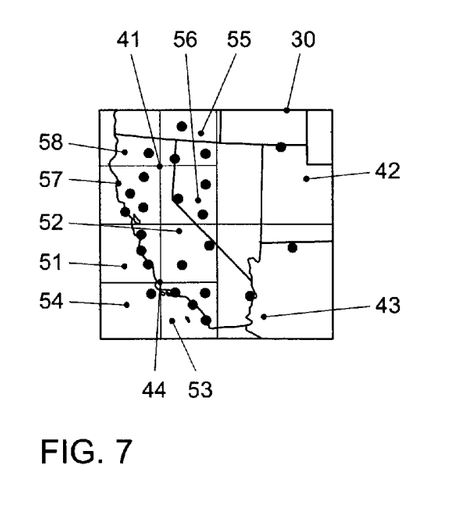
FIG. 7 shows a practical example for division of the geographic partial areas according to FIG. 6 into additional geographic partial areas.

Step 24 is follows by a query 25 whether an additional point of interest is to be included in database 11. If an additional point of interest is to be included in database 11, query 25 follows step 20. However, a new point of interest is no longer assigned to geographic area 30 but to one of the geographic partial areas 41, 42, 43, 44. If the number of points of interest assigned to the corresponding geographic partial area 41, 42, 43, 44 reaches the maximum number of points of interest assignable to geographic partial areas 41, 42, 43, 44, the corresponding geographic partial area 41, 42, 43 or 44, as shown in FIG. 7 with reference to geographic partial areas 41 and 44, is divided into four essentially square geographic partial areas 51, 52, 53, 54 and 55, 56, 57, 58. The geographic partial area 41 is then the geographic area with reference to geographic partial area 55, 56, 57, 58 and the geographic partial area 44 is the geographic area with reference to geographic partial areas 51, 52, 53, 54. Starting from a situation according to the example depicted in FIG. 7, a new point of interest is assigned to one of the geographic partial areas 42, 43, 51, 52, 53, 54, 55, 56, 57 and 58.

The navigation system 2, as shown in FIG. 1, also includes a man-machine interface 3 to enter at least one key word for characterization of a point of interest and to enter a geometric figure assigned to a geographic location and a search module 10 to search for at least one point of interest assigned to the key word within a geographic area defined by the geometric figure. The man-machine interface 3 includes an acoustic and/or tactile input device 12 and an optical, acoustic and/or tactile output device 14. In the present practical example, the output device 14 is a display and the input device 12 is a touch screen arranged above this display. Details concerning touch screens can be taken for example from the Internet site www.3m.com/3mtouchsystems/. The following touch screens of 3M™ are offered for example:

MicroTouch™ 12.1" FPD Touch Monitor
(cf. www.3m.com/3mtouchsystems/Products/Monitors/FPDesktop.jhtml)

MicroTouch™ M150 FPD Touch Monitor
(cf. www.3m.com/3mtouchsystems/Products/Monitors/M150.jhtml)

MicroTouch™ CRT Touch Monitor
(cf. www.3m.com/3mtouchsystems/Products/Monitors/CRTdesktop.jhtml)

MicroTouch™ ChassisTouch™ FPD Touch Monitor
(cf. www.3m.com/3mtouchsystems/Products/Monitors/FPDchassis.jhtml)

MicroTouch™ ChassisTouch™ CRT Touch Monitor
(cf. www.3m.com/3mtouchsystems/Products/Monitors/CRTchassis.jhtml)

Figure 8:
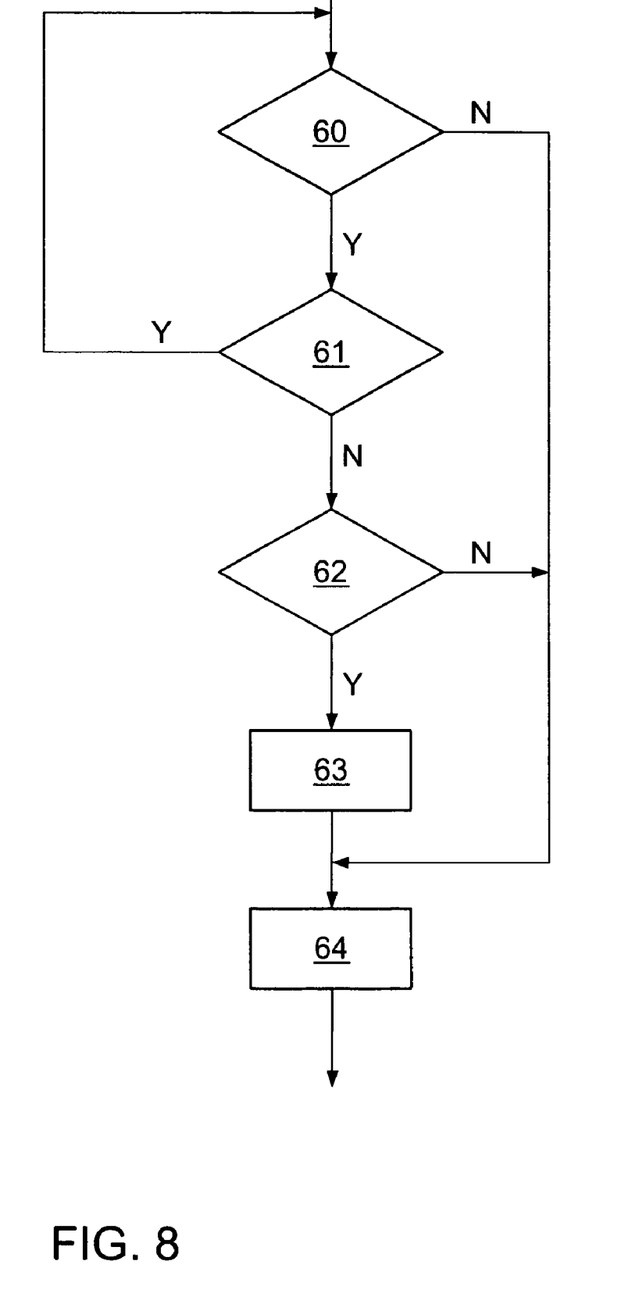
FIG. 8 shows a practical example of a plan implemented in the search module of a navigation system for a vehicle.
Figure 9:
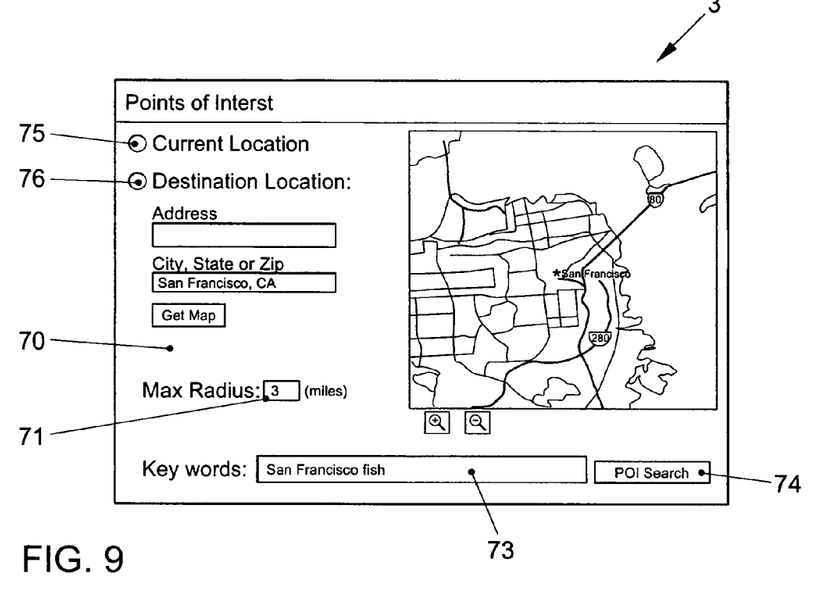
FIG. 9 shows a practical example of an input mask.

Additional details concerning touch screens can also be taken from the following Internet sites:

www.elotouch.com/products/default.asp www.3m.com/3mtouchsystems/Products/Resistive/5-wire.jhtml www.3m.com/3mtouchsystems/Products/Resistive/PL-.jhtml www.3m.com/3mtouchsystems/Products/Resistive/FG.jhtml www.3m.com/3mtouchsystems/Products/Resistive/SRTS.jhtml FIG. 8 shows a practical example of a procedure implemented in search module 10, which is started by means of an input mask depicted in FIG. 9 as practical example. In the left half 70 input fields 71, 75, 76 are provided for input of the geometric figure, in which by means of input fields 75 and 76 the center of the circle can be chosen as actual location of the vehicle or as destination address, and in which by means of input field 71 the radius of the circle can be entered. There is also an input field 73 to enter key words, in this case "San", "Francisco" and "fish". If long necessary inputs have been made, the procedure depicted in FIG. 8 can be started by touching button 74.

The procedure depicted in FIG. 8 begins with a query 60 whether the geographic area defined by the geometric figure lies in the geographic area 30. After geographic area defined by the geometric figure lies in the geographic area 30, query 60 is followed by a query 61 whether geographic partial areas 41, 42, 43, 44 are assigned to geographic area 30. If geographic partial area 41, 42, 43, 44 are assigned to geographic area 30, the query 60 is run for each geographic partial area 41, 42, 43, 44.

If the geographic area defined by the geometric figure lies in the geographic partial areas 41, 42, 43, 44, for example in the geographic partial area 41, with reference to the corresponding geographic partial areas or with reference to the corresponding geographic partial area 41 query 60 is followed by query 61 whether geographic partial areas 55, 56, 57, 58 are assigned to geographic partial area 41. With reference to the employed example according to FIG. 7 the geographic partial area 55, 56, 57, 58 are assigned to geographic partial area 41. Consequently, in this case query 60 follows query 61 again whether the geographic area defined by the geometric figure lies in the geographic partial areas 55, 56, 57, 58.

If the geographic area defined by the geometric figure lies in the geographic areas 55, 56, 57, 58, for example in the geographic partial area 57, with reference to the corresponding geographic partial areas or with reference to the corresponding geographic partial area 57 query 61 follows query 60 whether the geographic partial areas are assigned to geographic partial area 57. With reference to the employed example according to FIG. 7, no geographic partial areas are assigned to geographic partial area 57. Consequently, in this case a query 62 follows query 61 whether there are points of interest in the corresponding geographic partial area, i.e., in the present example in the geographic partial area 57 within the geographic region defined by the geometric figure, which are characterized by an employed key word or the employed key words, for example, "San", "Francisco" and "fish". If in the corresponding geographic partial area, i.e., in the present example of geographic partial area 57, at least one point of interest is present within the geographic region defined by the geometric figure, which is characterized by the employed key word or the employed key words, for example "San", "Francisco" or "fish", a step 63 follows query 62.

Figure 10:
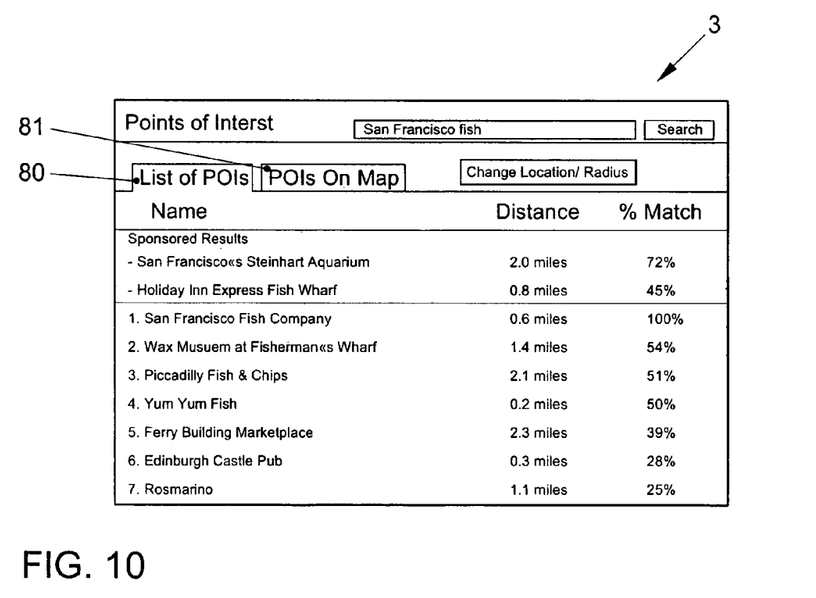
FIG. 10 shows a practical example of a result list.
Figure 11:
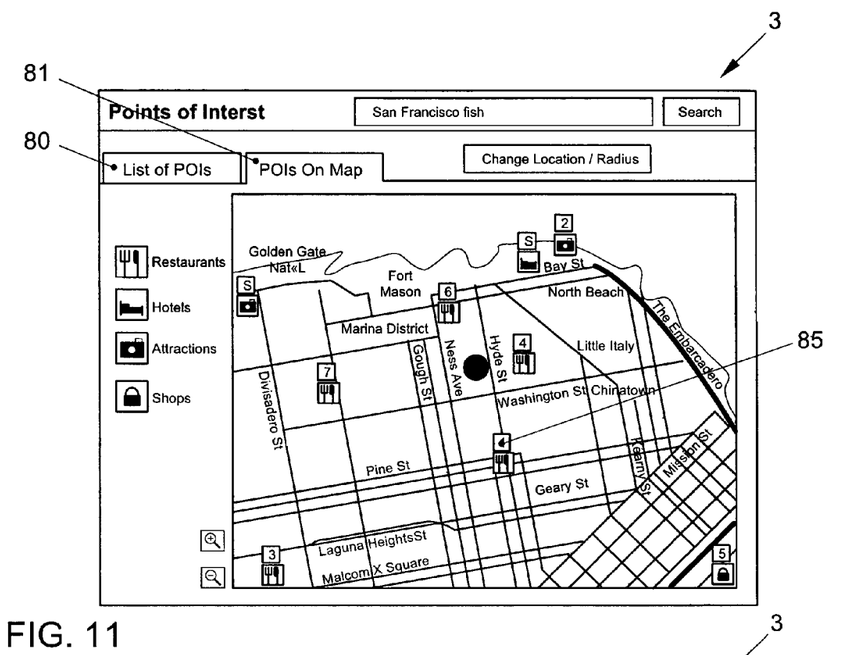
FIG. 11 shows a practical example of a map with a depiction of the entries of the result list according to FIG. 10.

In step 63 the points of interest lying in the corresponding geographic partial area, i.e., in the present example in geographic partial area 57 within the geographic region defined by the geometric figure are listed, which are characterized by an employed key word or employed key words, like "San", "Francisco" or "fish". Step 64 follows step 63 in which the listed points of interest are displayed. This occurs, for example, in the form of a result list depicted as an example in FIG. 10 and/or in the form of a map shown as an example in FIG. 11, in which the entries of the result list are entered. Thus, reference number 85 denotes the position of the entry "San Francisco Fish Company" of the result list. Between the result list shown as an example in FIG. 10 and the map shown as an example in FIG. 11 a switch can be made back and forth by touching the buttons 80 and 81 depicted as an index card icon.

Figure 12:
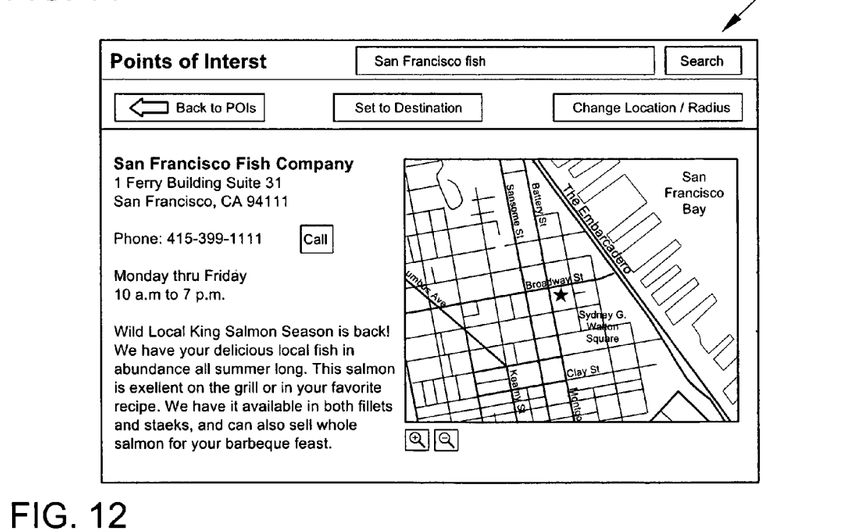
FIG. 12 shows a practical example of a depiction of detailed information.

It can be prescribed that the so-called sponsored results are shown. It can also be prescribed that by touching an entry of the result list, for the entry "San Francisco Fish Company", or by touching its corresponding position 85 in the map depicted in FIG. 11, detail information is displayed, as shown for example in FIG. 12.

LIST OF REFERENCE NUMBERS

1 Vehicle
2 Navigation system
3 Man-machine interface
10 Search module
11 Database
12 Input device
14 Output device
16 Navigation module
20, 22, 23, 24, 63, 64 Step
21, 25, 60, 61, 62 Query
30 Geographic area
31, 32, 33, 34, 35, 36, 37, 38 Points of interest
41, 42, 43, 44, 51, 52, 53, 54, 55, 56, 57, 58 Geographic partial area
70 Left half
71, 73, 75, 76 Input field
74, 80, 81 Button
85 Position

What is claimed is:

1. A navigation system for a vehicle, the navigation system comprising:
    a database including an allocation of a plurality of points of interest to a plurality of different predefined geographical areas, at least one predefined geographical area divided into a plurality of predefined geographical partial areas;
    a man-machine interface for entry of at least one key word for characterization of a point of interest and for entry of a geometric figure, and
    a search module for searching for at least one point of interest assigned to the key word within a geographic area defined or determined by the geometric figure, the search module configured to:
        identify a particular predefined geographical area corresponding to the geographic area defined or determined by the geometric figure;
        determine whether the identified particular predefined geographical area is divided into a plurality of predefined geographical partial areas; and
        if so, identify a particular predefined geographical partial area corresponding to the geographic area defined or determined by the geometric figure.

2. A navigation system according to claim 1, wherein the geometric figure is essentially round.

3. A navigation system according to claim 1, wherein the geometric figure is essentially a circle.

4. A navigation system according to claim 3, wherein the circle can be established by entering its radius.

5. A navigation system according to claim 4, wherein the position of the vehicle or a destination position is the center of the circle.

* * * * *